United States Patent [19]

Vulcano

[11] Patent Number: 5,006,001
[45] Date of Patent: Apr. 9, 1991

[54] KEYBOARD WITH ONE HAND CHARACTER KEY ARRAY AND ONE HAND MAPPING KEY ARRAY

[76] Inventor: Terrance E. Vulcano, R.R. #4, Calgary, Alberta, Canada, T2M 4L4

[21] Appl. No.: 414,124

[22] Filed: Sep. 27, 1989

[51] Int. Cl.$^5$ .............................................. B41J 5/08
[52] U.S. Cl. ................................... 400/486; 400/489
[58] Field of Search ............... 400/472, 477, 485, 486, 400/488, 489

[56] References Cited

U.S. PATENT DOCUMENTS

| | | |
|---|---|---|
| 440,086 | 11/1890 | Wright . |
| 3,698,533 | 10/1972 | Illig et al. . |
| 3,929,216 | 12/1975 | Einbinder . |
| 4,244,659 | 1/1981 | Malt ................................... 400/486 |
| 4,310,254 | 7/1982 | O'Angiolillo et al. ............... 400/486 |
| 4,522,518 | 6/1985 | Schmidt . |
| 4,613,247 | 9/1986 | McGunnigle ........................ 400/489 |
| 4,715,736 | 12/1987 | McGunnigle ........................ 400/486 |
| 4,824,268 | 4/1989 | Diernisse ............................. 400/486 |
| 4,836,700 | 6/1989 | Jensen ................................. 400/489 |
| 4,906,117 | 3/1990 | Birdwell ............................. 400/472 |

FOREIGN PATENT DOCUMENTS

| | | | |
|---|---|---|---|
| 2587815 | 3/1987 | Canada ................... 400/486 |
| 0213022 | 3/1987 | European Pat. Off. ............ 400/489 |
| 3401941 | 7/1984 | Fed. Rep. of Germany ...... 400/486 |
| 2041295 | 9/1980 | United Kingdom ................ 400/489 |
| 2064187 | 6/1981 | United Kingdom ................ 400/489 |
| 2933745 | 8/1984 | United Kingdom ................ 400/489 |

OTHER PUBLICATIONS

"Easy to Learn Programmable Keyboard" IBM Technical Disclosure Bulletin, vol. 24, No. 5, 10/81, p. 2465.
"User Defined Keyboard Mapping with Enhanced Usability" IBM Tech. Discl. Bulletin, vol. 30, No. 11, 4/88, pp. 127-132. & 32.
"Interactive Keyboard Customization Program" IBM Tech. Discl. Bulletin, vol. 32, No. 5A, 10/89, pp. 123-125.

Primary Examiner—Eugene H. Eickholt
Attorney, Agent, or Firm—Murray E. Thrift; Stanley G. Ade; Adrian D. Battison

[57] ABSTRACT

A keyboard for use with typewriters, computers, work processors or the like has two components, one operated by each hand. One of the components includes a small array of keys used for typing in characters. The other component has a number of keys for re-mapping the character input keys. Each of the mapping keys assigns a different set of characters or functions to the character keys, so that all alphabetic, numeric and punctuation characters, computer functions and controls and word processing commands can all be entered using a single small array of keys with minimum finger movement.

20 Claims, 6 Drawing Sheets

KEYBOARD WITH ONE HAND CHARACTER KEY ARRAY AND ONE HAND MAPPING KEY ARRAY

FIELD OF THE INVENTION

The present invention relates to keyboards and more particularly to an input keyboard for the transfer of information from a human operator to a machine that may be a typewriter, word processor, computer terminal or other device for receiving such information.

BACKGROUND

The standard typewriter keyboard has persisted in use for many years. Various proposals have been made for alternative keyboard layouts that are intended to be easier to use. Some of these involve rearranging the keys into left hand and right hand key groupings, usually according to the frequency of use of the keys. With as many, if not more, keys than the standard keyboard, these rearrangements of the keys remain as difficult to master as the standard keyboard.

In addition to the general purpose keyboards that have been developed, a number of specific purpose keyboards have also been proposed. Because these are special purpose devices they cannot be used for general purpose typing, word processing and the like.

The present invention is concerned with the provision of a novel keyboard layout.

SUMMARY

According to one aspect of the present invention there is provided an input keyboard for the transfer of information to a machine by a human operator, comprising:

a plurality of character keys arranged in a first array and positioned to facilitate operation of all of the character keys by one hand of the operator, each character key being operative for generating a manifestation of a character or function assigned thereto;

a plurality of mapping keys arranged in a second array and positioned to facilitate operation of all of the mapping keys by the other hand of the operator, each mapping key being operative to generate a respective predetermined assignment of characters or functions to the character keys.

With this keyboard layout, one hand does all of the typing, while the other hand is used to "map" the keyboard, assigning different characters to the character keys. A second set of mapping keys may be associated with the first array of character keys so that typing can be performed comfortably and quickly using a single hand.

Preferably, the main character keys are arranged in columns of three or four keys each. In use, one finger is assigned to each column so that there is ready access to each key using the fingers of one hand. To minimize lateral hand movement, the character keys are desirably arranged in five columns.

In laying out the keyboard for alphabetic keying with a twenty-six letter alphabet, the alphabet is divided into two parts. One of these is composed of the most commonly used letters, which are referred to as "primary characters", while the other part is composed of the less frequently used letters or "secondary characters". The keyboard is normally mapped to assign primary characters to the character keys, and may be shifted to a secondary mapping, assigning the secondary characters to the character keys by using a secondary mapping key in the second array. Other mapping keys can be used to assign upper case or capital letters, numerals, punctuation marks, word processing functions, computer functions or computer control functions to the character keys as desired. Thus, the keyboard is useful for all common keyboard functions. With an appropriate arrangement of the character assignments, typing on the keyboard is easy to learn and convenient to use.

BRIEF DESCRIPTION OF THE DRAWINGS

In the accompanying drawings, which illustrate exemplary embodiments of the present invention.

DETAILED DESCRIPTION

In the following, the keyboard will be described as having right hand and left hand components. This is for the sake of convenience. The keyboard may be arranged with the "left hand" component on the right which may be convenient for some left handed people. It is also possible to invert the keyboard layout in its entirety for use by left handed persons.

Figure 1:
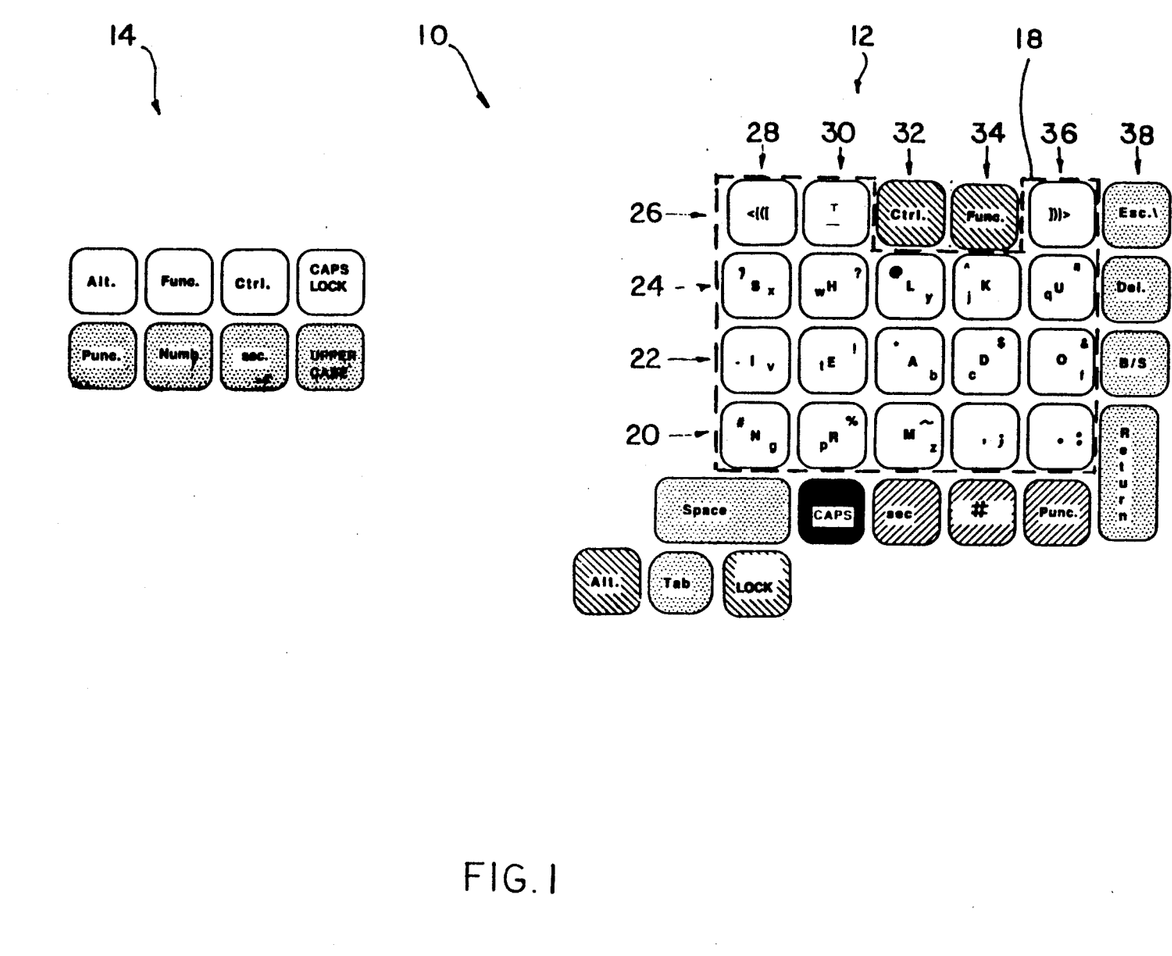
FIG. 1 is an illustration of a keyboard layout according to the present invention.

Referring to the accompanying drawings, FIG. 1 illustrates a keyboard 10 with a right hand component 12 and a left hand component 14.

The right hand component consists of an array of keys including the character keys within the area surrounded by the broken line 18. The character keys are arranged in first, second, third and fourth rows 20, 22, 24 and 26 respectively, all arranged transversely of the keyboard component 12 as viewed by an operator. The character keys are also arranged in first through fifth columns 28, 30, 32, 34 and 36 respectively from left to right of the key array as viewed by an operator. These keys are used as the information input keys to the machine, whether it be a typewriter, word processor, computer or the like. In the fourth row there are three character keys in the first, second and fifth columns. The third and fourth columns are occupied by a control key (Ctrl.) and a function key (Func.) respectively.

On the right of the character keys 18 is a column of operation keys 38. This includes, from bottom to top, a return key (Return), a back space key (B/S), a delete key (Del.) and an escape key (Esc.).

Below the character keys 18 is a further row of keys. This includes a space key (Space) at the left, which has the same function as the space bar and four "mapping" keys, a capitals key (Caps), a secondary characters key (Sec.), a numerals key (#) and a punctuation key (Punc.). The bottom row in the right hand component consists of an alternate key (Alt.) a tab key (Tab) and a capitals lock key (Lock) Which are at the left hand side below the Space and Caps keys.

The left hand component of the keyboard includes an array of mapping keys. A lower row of four keys includes a punctuation key (Punc.), a numerals key (#), a secondary selection key (Sec.) and a capitals key (Caps). These are arranged in that sequence from left to right in the lower row. Immediately above those keys is a second row of four keys including an alternate key (Alt.), a function key (Func.) and a control key (Ctrl.). The remaining key is a capitals lock key (Lock) located immediately above the Caps key.

With this keyboard, the right hand does all of the actual character input to the machine, whether it be a typewriter, word processor, computer, calculator or other device. Pressing any character key generates a manifestation of the character or function assigned to that key for the time being. The character and function assignments are performed by the mapping keys operated by the left hand or, where desired, by the duplicate mapping keys incorporated into the right hand key array.

Figure 2:
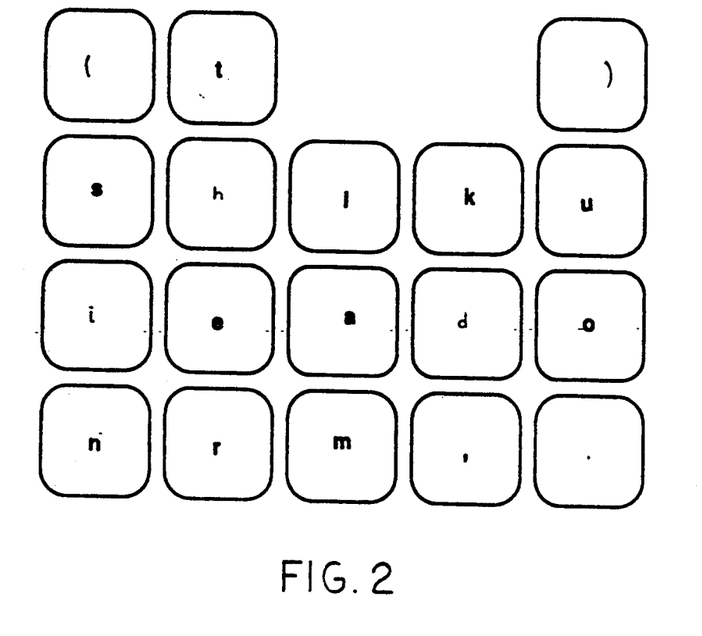
FIG. 2 illustrates a primary character assignment for the right hand array of keys.

The character keys of the right hand array are illustrated in FIG. 2 marked with the primary character assignment. This is the "Default" assignment of the characters to the character keys which is adopted after a character key has been pressed and before a mapping key is pressed.

While there are eighteen character keys in the right hand array, thirteen of these are the dominant key positions, these are, in the primary assignment, assigned the thirteen letters of the alphabet that are for the most part, the most commonly used. The second row from the second to fifth columns is the "home row" over which the fingers of the right hand are normally positioned. Each finger is assigned a column of three keys to type, with the exception of the index finger, which is assigned an extra column, the first column.

With specific reference to the character assignments, the fifth column contains the two vowels u and o in the third and second rows respectively. These are typed by the little finger. In the fourth column, the keys in the third and second rows are assigned the characters k and d, to be typed by the ring finger. In the third column, the third through first rows contain the letters l, a and m respectively which are to be typed by the middle finger. In the second column, the keys in the fourth through first rows are assigned the letters t, h, e and r respectively, all of which are typed by the index finger.

In the first column, the keys in the third through first rows are assigned the characters s, i and n.

It will be observed that all of the letters are lower case letters.

The character assignment in the primary assignment is completed with an open parenthesis (() in the first column, fifth row, a closed parenthesis ()) in the fifth column, fifth row, a comma (,) in the first row, fourth column and a period (.) in the first row, fifth column.

Figure 3:
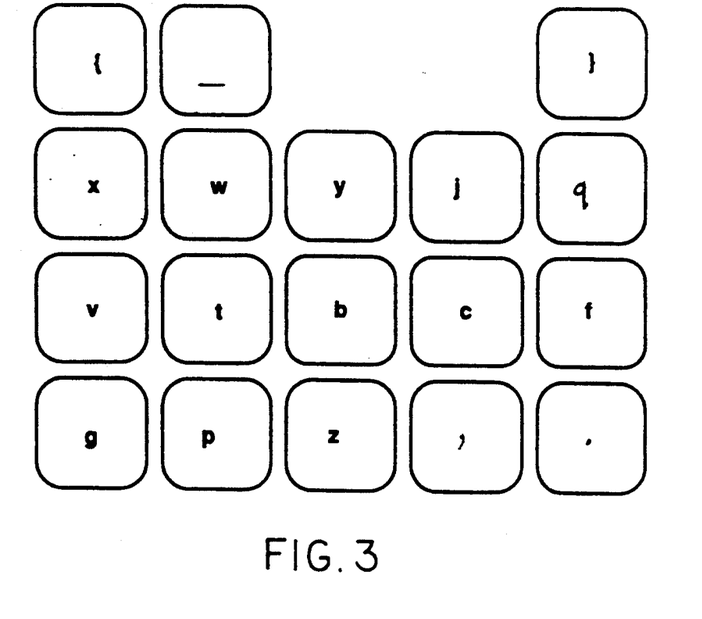
FIG. 3 illustrates a secondary character assignment.

The secondary character assignment is an assignment of the lower case letter characters that were not assigned in the primary assignment. In the first row, the keys are assigned the characters g, p, z, comma (,) and period (.) from left to right. In the second row, the keys are assigned the characters v, t, b, c and f from left to right. In the third row, the keys are assigned the characters x, w, y, j and q from left to right. In the fourth row, the three keys are assigned the characters open brace ({), underline (_) and close brace (}).

Figure 4:
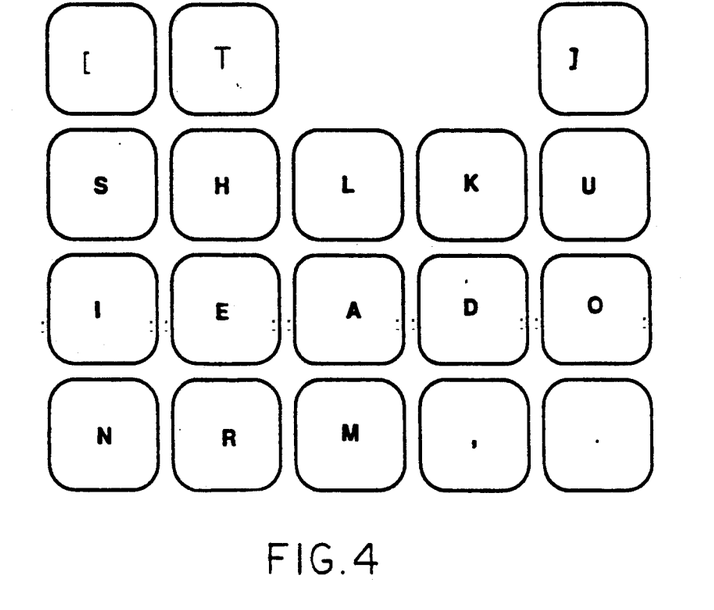
FIG. 4 illustrates a capital letters assignment.

The capital, or upper case, letters are typed using the Caps key so that if the board is in the primary assignment, this produces the character assignment illustrated in FIG. 4. The letters and symbols are all arranged as in the primary assignment, with the exception of the parentheses that have been replaced with square brackets ([ and ]).

Figure 5:
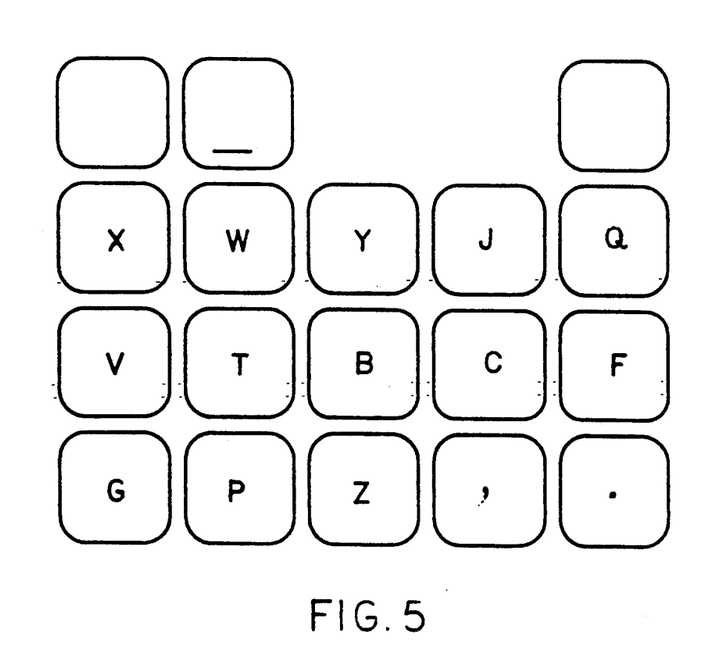
FIG. 5 illustrates a secondary letters capitals assignment.

The capitals of the secondary letters are achieved by pressing both the Sec. and the Caps keys to achieve the character assignment illustrated in FIG. 5. The letters and symbols are arranged as in the secondary assignment, although the character keys in the fourth row, first and fifth columns remain unassigned.

The division of the alphabet into two portions is based on the frequency with which the individual letters and letter pairings are used. The letters of the primary assignment are for the most part those most commonly used. They are arranged in short columns, each assigned to a finger. The arrangement of letters is intended to minimize finger movement by accommodating the most frequent combinations of letter sequences. In typing one character to the next, the typing movement is usually to an adjoining key, the same key or to a key in the home row. Thus, the commonly used word "the" is typed with three consecutive keys in the second column. The "sh" combination is two adjacent keys in the third row and the common "ing" combination is typed with two adjacent keys in the first column of the primary assignment and the same key as the "n" key which is assigned "g" in the secondary assignment.

Figure 6:
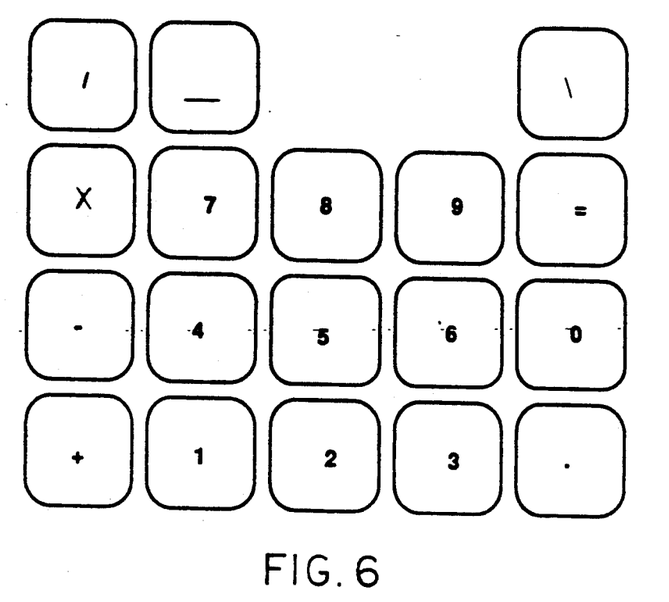
FIG. 6 illustrates a numerals assignment.

Pressing the # key remaps the character keys as illustrated in FIG. 6. In that mapping, the numerals in the first row are assigned the plus symbol (+), the numerals 1, 2 and 3, and a decimal point (.). In row two, the keys are assigned the minus symbol (—) and the numerals 4, 5, 6 and 0 reading from left to right. In the third column, the keys are assigned the multiplication symbol (x), the numerals 7, 8 and 9 and the equals sign (=). The keys of the fourth row are assigned the characters solidus (/), underlining (_) and back slash ( ).

Figure 7:
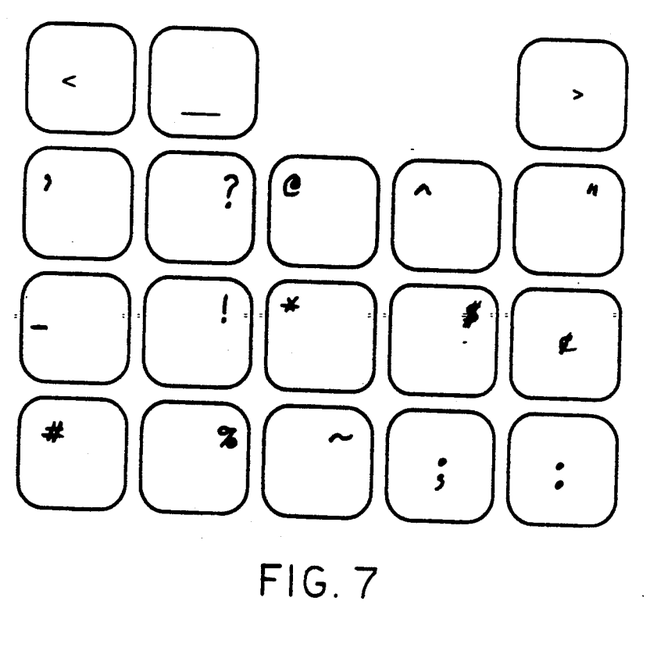
FIG. 7 illustrates a punctuation mark assignment.

When the Punc. key is pressed, the keyboard is mapped as illustrated in FIG. 7. The keys of the first row are assigned as characters the number sign or octothorpe (#), percent (%), tilde (18 ), semi-colon (;) and colon (:). The keys of the second row are assigned the characters dash (—), exclamation mark (!), asterisk (*), dollar sign ($) and ampersand (&). In the third row, the keys are assigned the characters apostrophe ('), question mark (?), at symbol (@), caret ( ) and quotation marks ("). In the fourth row, the character keys are assigned the symbols angle bracket or less than (<), underline (_) and angle bracket or greater than (>). The punctuation marks are assigned to provide an association between the mark and the character assignment of the primary assignment. Thus, the exclamation mark is assigned to the same key as "e"; the dollar sign is assigned to the same key as "d"; the number sign (octothorpe) is assigned to the same key as "n"; the asterisk is assigned to the same key as "a", and so on.

In addition to mapping the character keys to generate manifestations of the various characters referred to in the foregoing, the keyboard is also equipped with alternate (Alt.) function (Func.) and control (Ctrl.) keys that assign to the character keys various different functions. The Alt. key maps the character keys to provide word processing functions and the Ctrl. key maps the control keys by assigning them various computer control functions. The Func. key maps the control keys to provide computer functions as illustrated in FIG. 8.

Figure 8:
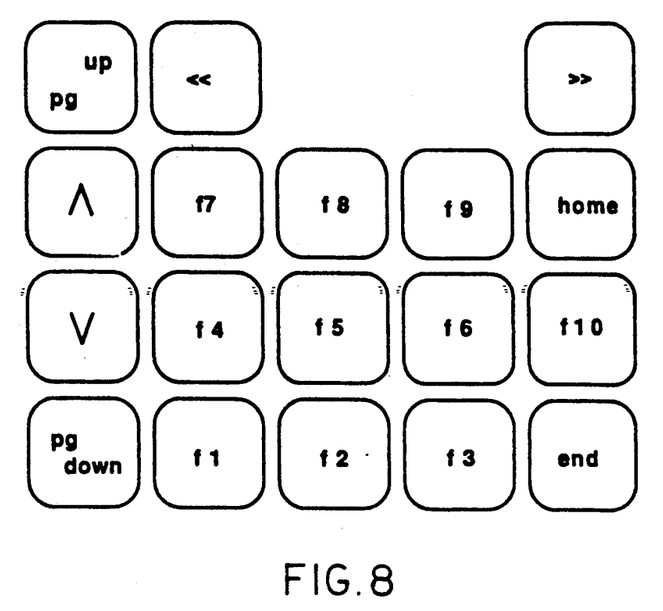
FIG. 8 illustrates a computer function assignment.

Referring to FIG. 8, the character keys in the first row are assigned the function page down (pg down), F1, F2, F3 and end. In the second row, the first key is assigned the cursor down function, while the remaining keys are assigned the functions F4, F5, F6 and F10. In the third row, the first key is assigned the cursor up function, while the remaining keys are assigned F7, F8, F9 and home functions. In the fourth row, the first key is assigned the page up (pg up) function, while the remaining two keys are assigned the cursor left and cursor right functions. The association concept is continued with the functions being assigned to the same keys as the corresponding numerals. Thus F1 and 1 are assigned to the same key: F2 and 2 are assigned to the same key and so on.

The keyboard can therefore perform all of the functions of a full function word processing or computer keyboard, with a minimum number of keys and a minimum amount of finger movement.

In use of the keyboard, pressing a mapping key remaps the keyboard for the next stroke of a character key. The keyboard then returns to its primary mapping. This return can be overridden to lock the mapping in the Caps mode using the key. Other mappings may also be subject to the lock-in function if this is desired.

Figure 9:
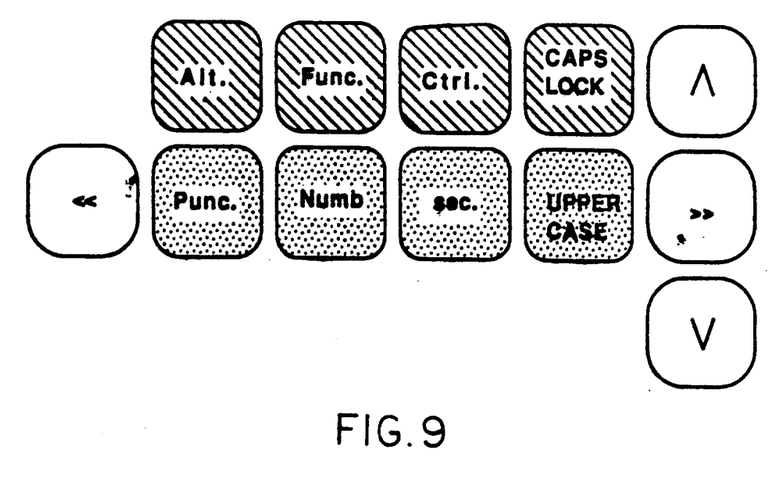
FIG. 9 illustrates an alternative left hand key array.

An alternative embodiment of the left hand key array is illustrated in FIG. 9. The basic array of the keys remains the same but cursor control keys have been added with cursor left and cursor right keys at the left and right ends of the first row of mapping keys and cursor up and cursor down keys above and below the cursor right key.

The keyboard may be augmented with a cursor joy stick located immediately to the left of the right hand key board array.

Figure 10:
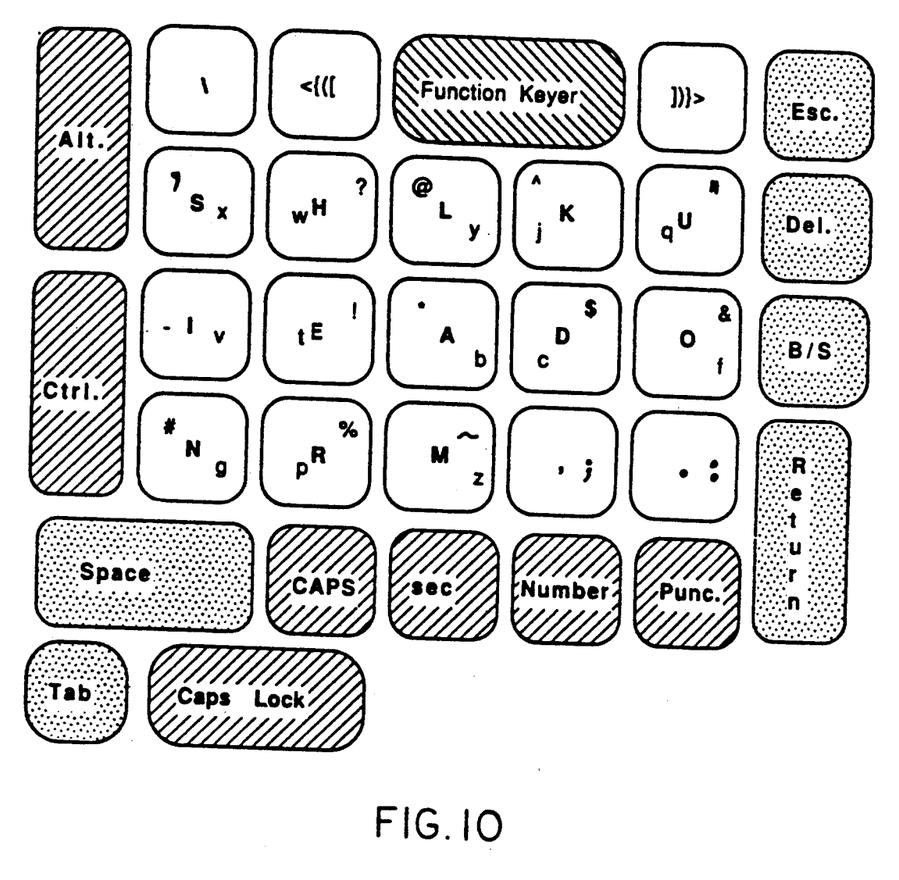
FIG. 10 illustrates an alternative right hand component.

FIG. 10 illustrates an alternative right hand component. In this embodiment, the Alt. and Ctrl. keys are double height keys arranged in a column to the left of the character keys, the Punc. key is a double width key in the fifth row, third and fourth columns. The lock key is a double width key below the Caps key and the right hand end of the Space key. Otherwise, the keyboard remains the same.

While the keyboard arrangement has been described in terms of right hand and left hand arrays, it is to be understood that the arrangement may be reversed, with the mapping keys operated by the right hand, and the function keys operated by the left. Where desired, this can be done by making the two arrays as separate components that are moveable with respect to one another. Alternatively, a left hand version of the keyboard can be produced as a mirror image of the version described in this specification.

Finger dexterity is another factor in the design of the keyboard and arrangement of the character assignments. For example, the index finger, which is the most dextrous digit, is in the exemplary embodiments given the most "work" to do. The less dextrous ring and middle fingers have only three character keys each to key.

The embodiments of the invention described in the foregoing include specific character and function assignments. It is possible to modify those if desired without departing from the scope of the present invention.

It is therefore to be understood that the present invention is not limited to the illustrated embodiment but that various modifications may be made within the scope of the invention.

The invention is to be considered limited only by the scope of the appended claims.

What is claimed:

1. An input keyboard for the transfer of information to a machine by a human operator, comprising:
    a plurality of character keys arranged in a first array positioned at a first location to facilitate operation of all of the character keys by one hand of the operator, each character key being operative for generating a manifestation of a character or function assigned thereto;
    a plurality of mapping keys arranged in a second array positioned at a second location spaced from the first location to facilitate operation of all of the mapping keys by the other hand of the operator, each mapping key being operative to generate a respective predetermined assignment of characters or functions to the character keys.

2. A keyboard according to claim 1 wherein the first array comprises at least three transverse rows of character keys, with a center row thereof being a home row.

3. A keyboard according to claim 2 wherein the first array comprises five columns of keys.

4. A keyboard according to claim 3 wherein the first array comprises a fourth row of keys including three character keys.

5. A keyboard according to claim 3 wherein the second array comprises at least a first transverse row of mapping keys, each operating to generate a respective predetermined assignment of characters to the character keys.

6. A keyboard according to claim 5 wherein the first transverse row of the second array comprises at least four keys.

7. A keyboard according to claim 5 wherein the second array further comprises a second transverse row of mapping keys, each operating to generate a respective predetermined assignment of functions to the character keys.

8. A keyboard according to claim 7 wherein the second row of the second array further includes a lock key for locking at least one of the mapping key assignments.

9. A keyboard according to claim 1 wherein the first array further comprises a plurality of operating keys.

10. A keyboard according to claim 9 wherein the operating keys are arranged in a column beside the character keys.

11. A keyboard according to claim 1 wherein the first array further includes duplicate mapping keys.

12. A keyboard according to claim 11 wherein the duplicate mapping keys are arranged in a row below the character keys.

13. A keyboard according to claim 1 wherein the first array further includes a plurality of duplicate mapping keys arranged in a column beside the character keys.

14. A keyboard according to claim 4 wherein the first array comprises a duplicate function key in the fourth row of keys.

15. A keyboard according to claim 13 wherein the first array further includes a mapping key in a fourth row of keys in the first array.

16. A keyboard according to claim 1 wherein the first array includes a space key below the character keys.

17. A keyboard according to claim 16 wherein the first array includes a tab key below the space key.

18. A keyboard according to claim 1 wherein the first array includes a lock key for locking at least one of the mapping key assignments.

19. An input keyboard for the transfer of information from a human operator to a machine, comprising:
- a first array of keys including fifteen character keys arranged in first, second and third rows, and in first through fifth columns, each character key being operative for generating a manifestation of a character or a function assigned thereto;
- a second array of keys spaced to one side of the first array and including four mapping keys arranged in a first mapping key row, each mapping key being operative to generate a respective predetermined assignment of characters or functions to the character keys.

20. A keyboard according to claim 19 wherein each of the character keys of the first array has a primary character assignment in the absence of actuation of a mapping key.

* * * * *